United States Patent [19]

Ogawa

[11] Patent Number: 4,651,691
[45] Date of Patent: Mar. 24, 1987

[54] INTERNAL COMBUSTION ENGINE HAVING ALUMINUM ALLOY CYLINDER BLOCK

[75] Inventor: Naoki Ogawa, Yokohama, Japan

[73] Assignee: Nissan Motor Co., Ltd., Yokohama, Japan

[21] Appl. No.: 497,729

[22] Filed: May 24, 1983

[30] Foreign Application Priority Data

May 27, 1982 [JP] Japan .................................. 57-90178

[51] Int. Cl.$^4$ .............................................. F02F 7/00
[52] U.S. Cl. ........................... 123/195 H; 123/198 E;
384/429; 384/432
[58] Field of Search .......... 123/195 R, 195 C, 198 E,
123/195 A, 195 H, 196 W, 198 DA; 384/432,
429, 250, 433

[56] References Cited

U.S. PATENT DOCUMENTS

| | | | |
|---|---|---|---|
| 2,169,236 | 8/1939 | Frazier | 123/DIG. 3 |
| 2,442,237 | 5/1948 | Frazier | 123/DIG. 3 |
| 3,895,868 | 7/1975 | Castarede | 123/195 R |
| 4,213,440 | 7/1980 | Abe et al. | 123/195 C |
| 4,351,278 | 9/1982 | Gaschler et al. | 123/195 R |
| 4,412,514 | 11/1983 | Hayakawa et al. | 123/195 R |

FOREIGN PATENT DOCUMENTS

| | | |
|---|---|---|
| 0048028 | 3/1982 | European Pat. Off. . |
| 0065664 | 12/1982 | European Pat. Off. . |
| 87035 | 8/1936 | Sweden ........................ 123/196 W |
| 440837 | 1/1968 | Switzerland . |
| 1009977 | 11/1965 | United Kingdom . |

OTHER PUBLICATIONS

Edward F. Obert, *Internal Combustion Engines* Third Edition, 1968, pp. 666–667.
Service and Repair Instructions, Briggs and Stratton Corp., Nov. 1976.

*Primary Examiner*—Charles J. Myhre
*Assistant Examiner*—David A. Okonsky
*Attorney, Agent, or Firm*—Schwartz, Jeffery, Schwaab, Mack, Blumenthal & Evans

[57] ABSTRACT

An internal combustion engine comprises a cylinder block formed of aluminum alloy and having main bearing bulkheads each of which is formed with a bearing surface. Main bearing caps are securely connected respectively with the bearing bulkheads and formed of aluminum alloy. Each bearing cap is formed with a bearing surface which is located in opposition to the bearing surface of the bearing bulkhead. Additionally, the main journal of a crankshaft formed of iron alloy is rotatably disposed between the bearing surfaces of the bearing bulkhead and bearing cap. The surfaces of the crankshaft main journal is in direct contact with the bearing surfaces of the bearing bulkhead and bearing cap without using conventional bearing metals, thereby cutting off engine noise due to the existence of the bearing metals.

16 Claims, 10 Drawing Figures

INTERNAL COMBUSTION ENGINE HAVING ALUMINUM ALLOY CYLINDER BLOCK

BACKGROUND OF THE INVENTION

1. Field of the Invention

This invention relates to an improvement of an internal combustion engine having a cylinder block formed of aluminum alloy, and more particularly to a crankshaft bearing structure arranged to reduce noise due to bearing metals located in contact with the outer surface of a crankshaft.

2. Description of the Prior Art

In connection with automotive internal combustion engines, it is a recent tendency to employ a cylinder block formed of aluminum alloy and produced by die casting. Experiments have revealed that, in such engines, bearing metals located in contact with crankshaft main journals considerably contribute to an increase in engine noise, particularly of a high frequency range of from $10^3$ to $10^4$ Hz. This noise increase is believed to be caused by the fact that the existence of the bearing metals does not provide the right cylindrical shape of a bearing surface which is in direct contact with the crankshaft main journals, while allowing the bearing metals themselves to generate noise.

SUMMARY OF THE INVENTION

An internal combustion engine according to the present invention comprises a cylinder block formed of aluminum alloy and having main bearing bulkheads each of which is formed with a bearing surface. Main bearing caps are securely connected respectively with the bearing bulkheads and formed of aluminum alloy. Each bearing cap is formed with a bearing surface which is located in opposition to the bearing surface of the bearing bulkhead. Additionally, a crankshaft is rotatably supported by the bearing bulkheads and the bearing caps in such a manner that the main journal is located between the bearing surfaces of the bearing bulkhead and the bearing cap. The surface of the crankshaft main journal is in direct contact with the bearing surfaces of the bearing bulkhead and the bearing cap without using conventional bearing metals. The thus configured engine effectively cuts off noise due to bearing metals which are conventionally used, thereby achieving total engine noise reduction while simplifying the assembly process thereof.

BRIEF DESCRIPTION OF THE DRAWINGS

The features and advantages of the internal combustion engine according to the present invention will be more clearly appreciated from the following description taken in conjunction with the accompanying drawings in which like reference numerals designate like parts and elements throughout all the embodiments, in which.

DETAILED DESCRIPTION OF THE INVENTION

Figure 1:
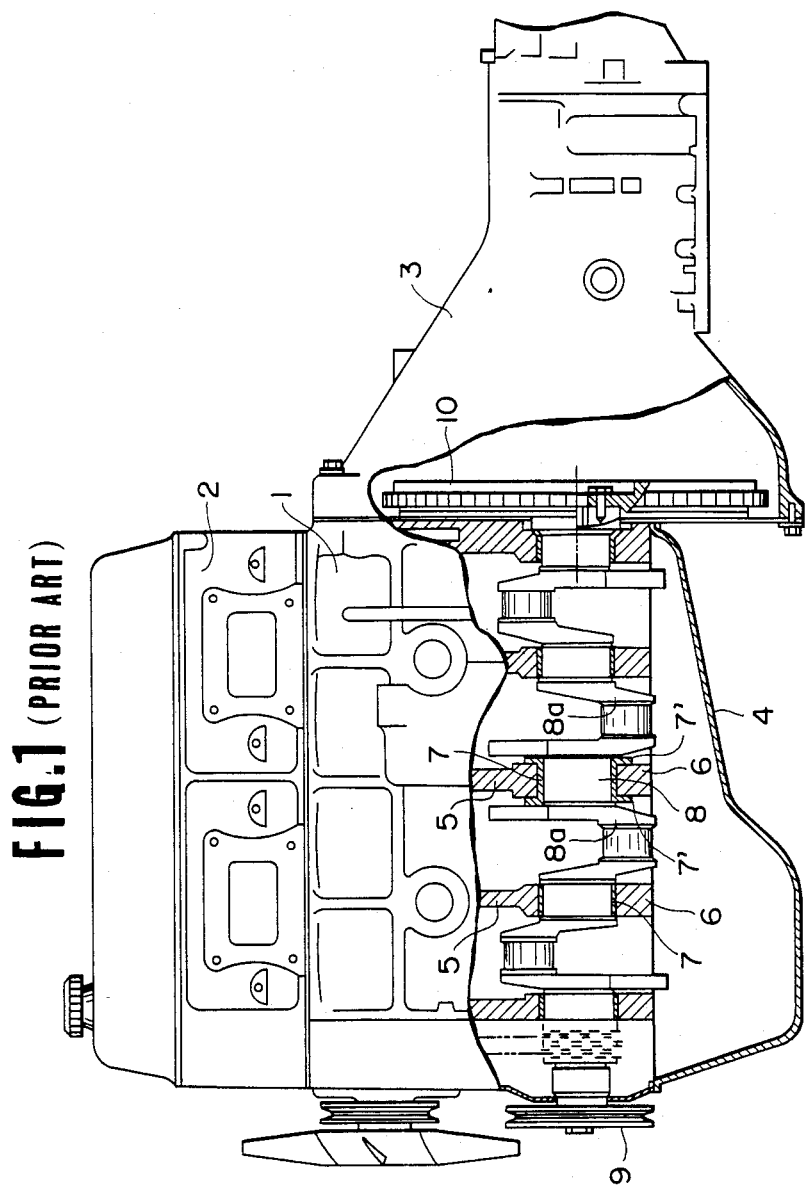
FIG. 1 is a side elevation, partly in section, of a conventional automotive internal combustion engine.

To facilitate understanding the present invention, brief reference will be made to a conventional automotive internal combustion engine, depicted in FIG. 1. In FIG. 1, the engine includes a cylinder block 1 which is usually formed of cast iron. The cylinder block is provided with a cylinder head 2, a transmission housing 3, and an oil pan 4. The cylinder block 1 is formed at its bottom section with a plurality of main bearing bulkheads 5. A plurality of main bearing caps 6 are located in opposition to and securely connected with the bearing bulkheads 5, respectively. Each journal of the crankshaft 8 is disposed between the connected bearing bulkhead 5 and bearing cap 6 through two semicylindrical bearing metals 7 which are in opposition to each other and disposed respectively along the inner sufaces of the bearing bulkhead 5 and the bearing cap 6.

The bearing metals 7 are made, for example, of tin-lead alloy or copper-lead alloy, from the view points of seizure prevention, good oil film retention, good wear resistance etc. Additionally, some bearing metal 7 is formed at the opposite sides with flange sections 7' which are so located as to be in contact with the crankshaft webs or arm sections 8a at the inner side surface in order to prevent the movement of the crankshaft 8 in its axial direction or the thrust direction, thereby supporting thrust load applied to the crankshaft 8. The reference numerals 9 and 10 denote a crankpulley and a flywheel, respectively.

Now, there has recently arisen a tendency for automotive engines that the cylinder block 1 is formed of aluminum alloy (by die casting) in place of cast iron in order to achieve weight reduction thereof. Even in such engines having the cylinder block made of aluminum alloy die cast, the crankshaft 8 is supported through the bearing metals 7.

A major problem encountered in the practical use of the aluminum alloy die cast cylinder block is that the cylinder block is increased in noise generation as compared with cylinder blocks formed of cast iron. In this regard, various propositions have been made on the aluminum alloy die cast engine to achieve noise reduction, in which only bearing bulkheads 5 and the bearing caps 6 are strengthened, intending an increase in support rigidity of a bearing structure for the crankshaft 8.

However, a variety of experiments conducted by the inventors of the present invention has revealed that a major factor of engine noise resides in the fact that the bearing metal 7 is interposed between the crankshaft 8 and the cylinder block bearing bulkhead 5 and between the crankshaft 8 and the bearing cap 6, in the internal combustion engine having the aluminum alloy cylinder block. More specifically, although the inner surface of the bearing cap 6 and the bearing bulkhead 5 is formed into a right cylindrical shape, such a right cylindrical shape of the bearing surface in rubbing contact with the crankshaft 8 is impaired by the existence of the bearing metal 7 interposed between the outer surface of the crankshaft 8 and the inner surface of the bearing cap 6 and the bearing bulkhead 5. Furthermore, the bearing metals 7 themselves tend to vibrate by explosive force acting on the pistons. These result in an increase in noise level in a high frequency range of from $10^3$ to $10^4$ Hz.

Figure 2:
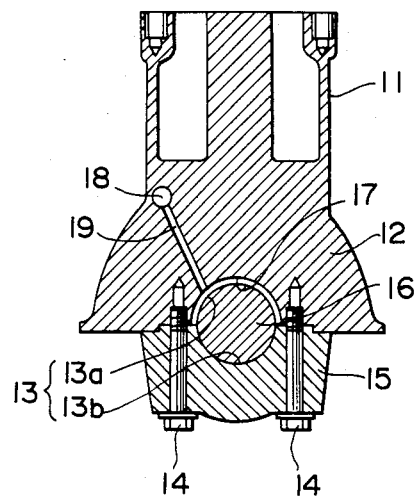
FIG. 2 is a vertical sectional view of an essential part of an embodiment of an internal combustion engine in accordance with the present invention.
Figure 3:
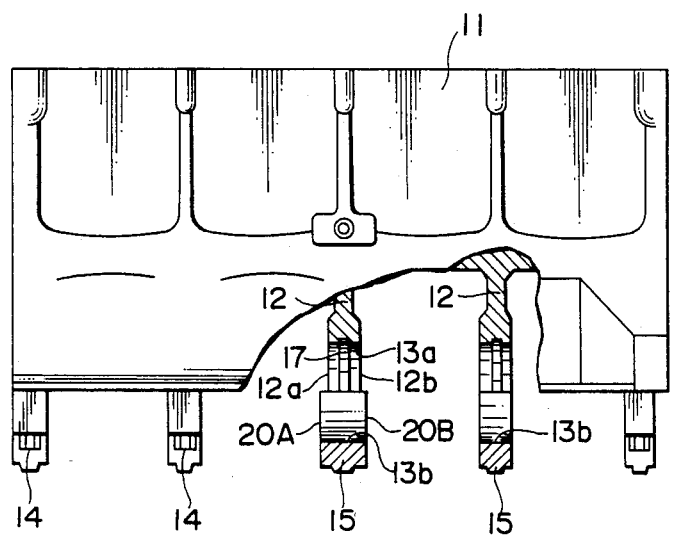
FIG. 3 is a side elevational view, partly in section, of FIG. 2.
Figure 4:
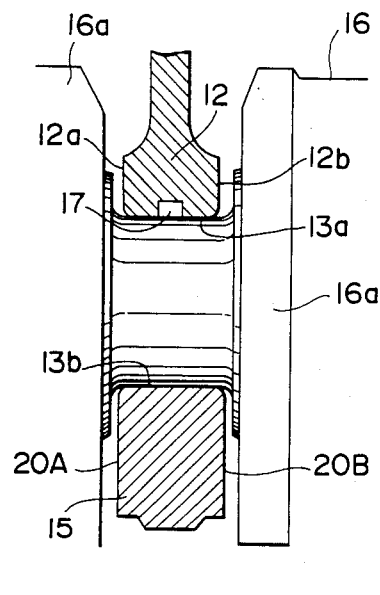
FIG. 4A is an enlarged view of a bearing structure for a crankshaft main journal of the engine of FIG. 2.
FIG. 4B is an enlarged view similar to FIG. 4A, but showing another example of the bearing structure.
Figure 4:
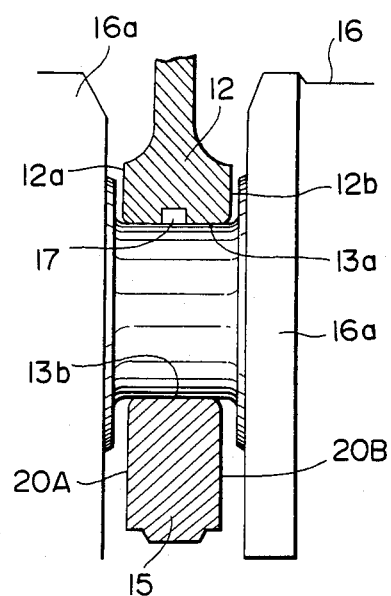

In view of the above description of the conventional automotive internal combustion engine, reference is now made to FIGS. 2 to 9, and more specifically to FIG. 2 to 4, wherein a preferred embodiment of an internal combustion engine of the present invention is illustrated. The engine, in this case, is of an automotive vehicle and comprises a cylinder block 11 which is formed of aluminum alloy and produced by die casting. The cylinder block 11 is formed integrally at the bottom section with a plurality of main bearing bulkheads 12 each of which is formed at the central part of the bottom edge with a semicylindrical bearing surface 13a.

A plurality of main bearing caps 15 are formed of aluminum alloy and securely connected respectively with the bearing bulkheads 12 by means of cap bolts 14. Each bearing cap 15 is formed at the upper central part with a semicylindrical bearing surface 13b which is located in opposition to the bearing surface 13a of the bearing bulkhead 12. The thus oppositely lain two bearing surfaces 13a and 13b constitute a right cylindrical bearing surface 13 on which one of the main journals of a crankshaft 16 is supported. The crankshaft 16 is, in this case, formed of iron alloy. It is to be noted that the main journal of the crankshaft 16 is directly supported on the bearing surface 13 without interposing bearing metals between the cylindrical outer surface of the crankshaft 16 and the cylindrical bearing surface 13. In other words, the cylindrical outer surface of the crankshaft 16 is in direct contact with the cylindrical bearing surface 13. An oil groove 17 is formed or chamfered only on the semicylindrical bearing surface 13a of the bearing bulkhead 12 and extends in the peripheral direction of the semicylindrical bearing surface 13a. Engine lubricating oil is supplied through the oil groove 17 into between the crankshaft 16 and the bearing surface 13 so as to form an oil film therebetween. It is to be noted that the semicylindrical bearing surface 13b of the bearing cap 15 on which explosive force is exerted is not formed with such an oil groove in order to obtain a greater contacting surface area for the purpose of reducing the exerted force per unit area. The reference numeral 18 denotes an oil gallery through which engine lubricating oil flows. The oil gallery 18 communicates through an oil passage 19 with the oil groove 17.

In this case, a centrally located bearing cap 15 of a plurality of bearing caps 15 is formed projecting in the axial direction of the crankshaft 16 relative to the opposed bearing bulkhead 12 as clearly shown in FIG. 4A. That is, the opposed side surfaces 20A and 20B of the centrally located bearing cap 15 lie outside the side surfaces 12a and 12b of the bearing bulkhead 12 in the axial direction of the crankshaft 16. Each side surface 20A, 20B of the centrally located bearing cap 15 forms a thrust support surface which is contactable with the side surface of a crankshaft web or arm section 16a, thereby supporting thrust load applied to the crankshaft as well as maintaining the crankshaft position. It will be understood that the thrust support surfaces 20A, 20B may be formed on either of the bearing caps 15 other than the centrally located bearing cap 15. Otherwise, similar thrust support surfaces may be formed on the opposed side surfaces 12a, 12b of either one of the bearing bulkheads 12 by so forming the bearing bulkhead that its thickness is larger than that of the bearing cap 15 as shown in FIG. 4B.

It is to be noted that the aluminum alloy as the material of the cylinder block 11 and the bearing caps 15 is, for example, AC4B (according to Japanese Industrial Standard) which is an aluminum alloy containing silicone and copper; and the iron alloy as the material of the crankshaft 16 is, for example, SCM 21 (according to Japanese Industrial Standard) which is an iron alloy containing chromium and molybdenum. It has been proved that sufficient seizure resistance, wear resistance, load resistance and the like required for crankshaft bearings are obtained even in the rubbing contact between such an aluminum alloy and such an iron alloy. Accordingly, in the engine according to the present invention, there arises no problem during operation at engine speeds within a usual range of internal combustion engines so that the engine of the present invention is sufficiently possible to be put into practical use.

With the thus arranged engine in which no bearing metal is used, the right cylindrical shape is obtained in the bearing surface 13 in rubbing contact with the crankshaft 16, so that only the oil film exists in a uniform clearance between the bearing surface 13 and the crankshaft 16. Accordingly, the vibration of the crankshaft 16 is suppressed while avoiding the vibration of bearing metals (used in conventional engines) themselves. This effectively reduces engine noise of a high frequency range due to crankshaft vibration and bearing metal vibration, while reducing the number of parts and simplifying the assembly process.

Figure 5:
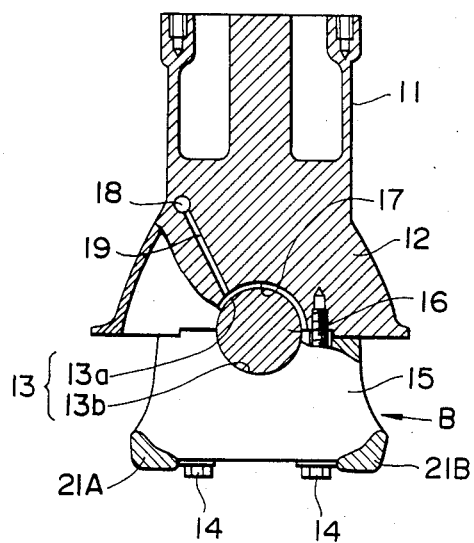
FIG. 5 is a vertical sectional view of an essential part of another embodiment of the engine in accordance with the present invention.
Figure 6:
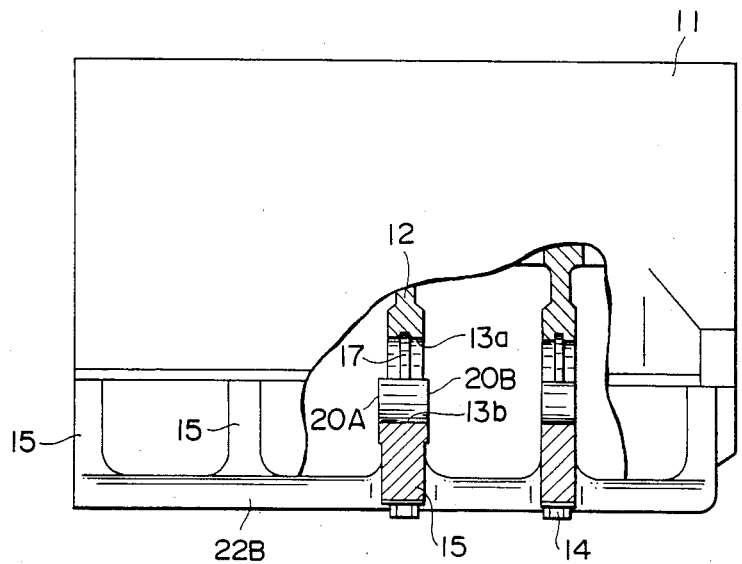
FIG. 6 is a side elevation, partly in section, of FIG. 5.

FIGS. 5 and 6 shows another embodiment of the engine in accordance with the present invention, in which the bearing caps 15 are integrally connected with each other in the fore and aft direction of the cylinder block 11 through two beam sections or members 21A and 21B. The two beam sections 21A and 21B are located at the bottom opposite corners of each bearing cap 15 and extend along the axis of the crankshaft 16, thereby constituting a so-called bearing beam structure B.

With this arrangement, each bearing cap 15 can be effectively suppressed in vibration in the crankshaft axis direction which causes the bearing cap to come down, thus preventing the partial or eccentric wear of the semicylindrical bearing surface 13b of the bearing cap 15. On the contrary, in conventional engines, bearing caps largely deform in a manner to come down in the crankshaft axis direction under the influence of explosive force, and therefore the partial or eccentric wear in the form of stripes tends to occur particularly on the bearing surface of the front-most and rear-most bearing caps which support the front and rear end sections of the crankshaft, because of the fact that these bearing caps are supported in a cantilever manner relative to a crankpulley and a flywheel, respectively (as shown in FIG. 1). Furthermore, according to the arrangement of FIGS. 5 and 6, the thrust load applied to the centrally located bearing cap 15 provided with the thrust support surfaces 20A, 20B can be dispersed over the other bearing caps 15 via the beam sections 21A, 21B.

Figure 7:
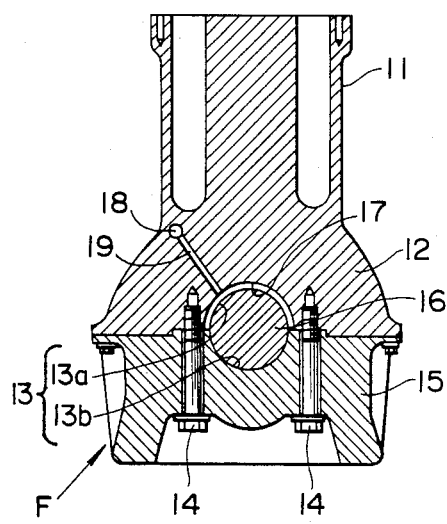
FIG. 7 is a vertical sectional view of an essential part of a further embodiment of the engine in accordance with the present invention.
Figure 8:
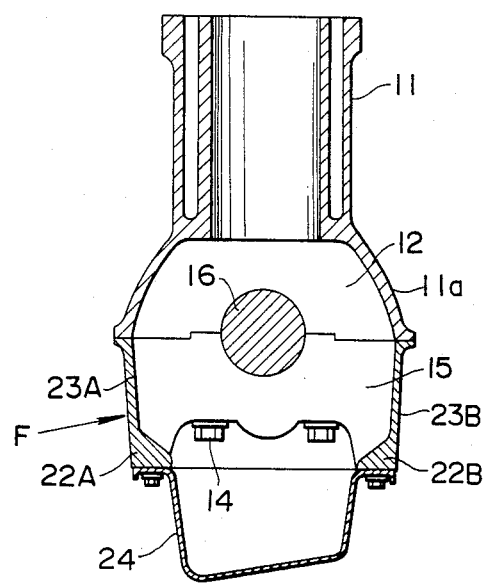
FIG. 8 is a vertical sectional view of the engine essential part of FIG. 7, but taken along a vertical plane different from in FIG. 7.

FIGS. 7 and 8 show a further embodiment of the engine in accordance with the present invention, in which the bearing caps 15 are formed integrally with oppositely located two beam sections 22A, 22B and oppositely located side wall sections 23A, 23B which define a part of a crankcase chamber, thereby forming a so-called bearing frame structure F of the one-piece type and formed of aluminum alloy. The two beam sections 22A, 22B are located at the bottom opposite corners of each bearing cap 15 and extend parallel along the axis of the crankshaft 16. The side wall sections 23A, 23B are so located as to connect the two beam sections 22A, 22B with the bottom edges of the skirt section 11a of the cylinder block 11 which section defines a part of the crankcase chamber. In this embodiment, an oil pan 24 is small-sized and installed to the bottom surfaces of the beam sections 22A, 22B as best shown in FIG. 8.

With this arrangement, each bearing cap 15 is effectively suppressed in the comming down vibration in the direction of the axis of the crankshaft 16 likewise in the embodiment of FIGS. 5 and 6. Furthermore, since the one-piece bearing frame structure F is remarkedly high in rigidity and the like against torsional vibration, the wear on the bearing surface 13b of the bearing cap 15 is uniformallized, thereby preventing the partial or eccentric wear of the bearing cap semicylindrical bearing surface 13b.

Figure 9:
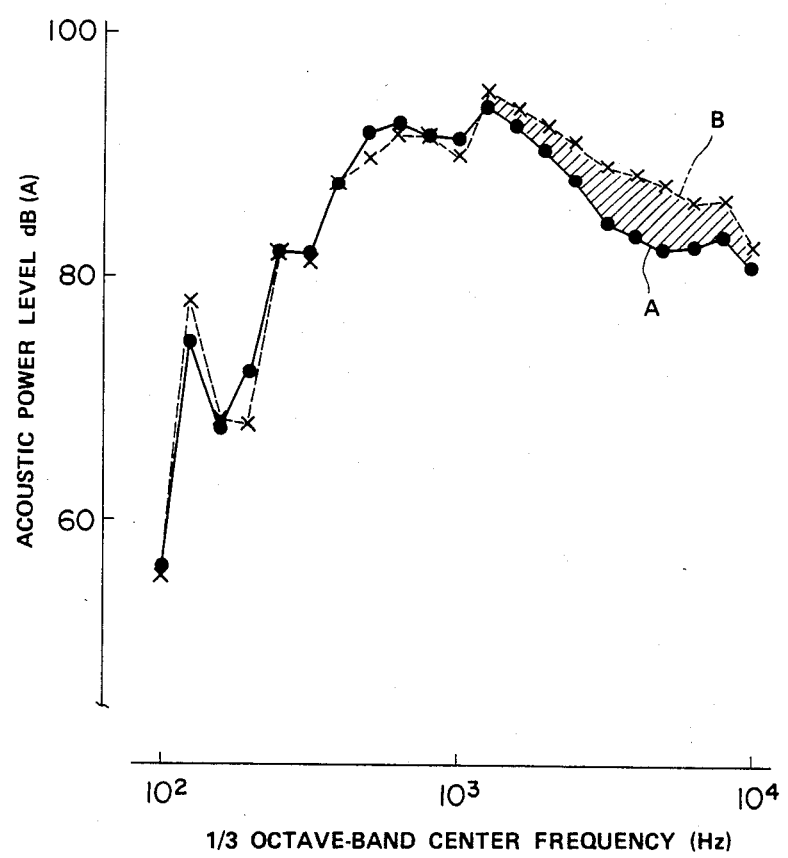
FIG. 9 is a graph showing a noise reduction effect of the engine of FIGS. 7 and 8 in terms of acoustic power level.

The noise reduction effect of the embodiment of FIGS. 7 and 8 is revealed in FIG. 9, as compared with an engine which is the same as the engine of FIGS. 7 and 8 except for employing bearing metals each of which is disposed between the outer surface of the crankshaft main journal and the bearing surface 13. In FIG. 9, a solid line A indicates the acoustic power level dB(A) of the engine of FIGS. 7 and 8, while a dotted line B indicates the acoustic power level of the engine using conventional bearing metals. As apparent from FIG. 9, the arrangement of FIGS. 7 and 8 achieves a considerable reduction of noise within a high frequency range of from $10^3$ to $10^4$ Hz.

As will be appreciated from the above, according to the present invention, an internal combustion engine having a cylinder block formed of aluminum alloy effectively cuts off engine noise due to the existence of bearing metals which are conventionally used, thereby achieving total engine noise reduction while making it possible to reduce the number of parts and the number of assembly processes in order to achieve a cost reduction.

What is claimed is:
1. An internal combustion engine comprising:
a cylinder block formed of aluminum alloy and having main bearing bulkheads each of which is formed with a bearing surface;
main bearing caps formed of aluminum alloy and securely connected, respectively, with said bearing bulkheads, said bearing caps being formed with bearing surfaces which are located, respectively, in opposition to the bearing surfaces of said bearing bulkhead;
a crankshaft formed of iron alloy and rotatably supported by said bearing bulkheads and said bearing caps, the main journal of said crankshaft being located between the bearing surfaces of said bearing bulkheads and said bearing caps, the surface of said crankshaft main journal being in direct contact with the bearing surfaces of said bearing bulkheads and said bearing caps; and means defining an oil groove on the bearing surface of each bearing bulkhead for supplying engine lubricating oil between the crankshaft main journal and the bearing surfaces of said bearing bulkheads and said bearing caps, said oil groove extending along the periphery of the bearing bulkhead bearing surfaces, said bearing surfaces of said bearing caps being free of oil grooves so as to provide maximum contacting area with said main crankshaft journal to acsorb greater explosive force.

2. An internal combustion engine as claimed in claim 1, wherein at least one bearing cap is formed with a thrust support surface for supporting the thrust load applied to said crankshaft, said thrust support surface being loacted to be contactably with a part of an arm section of said crankshaft.

3. An internal combustion engine as claimed in claim 2, wherein said at least one bearing cap is formed projecting in the direction of the axis of said crankshaft relative to said bearing bulkhead connected thereto, to form said thrust support surface.

4. An internal combustion engine as claimed in claim 3, wherein said at least one bearing cap is formed with opposite side surfaces facing arm sections of said crankshaft, said opposite side surfaces lying outside the opposite side surfaces of said bearing bulkhead, connected thereto, respectively, which bearing bulkhead side surfaces are facing arm sections of said crankshaft.

5. An internal combustion engine as claimed in claim 4, wherein said at least one bearing cap is positioned at a central section of the engine in the direction of the crankshaft axis.

6. An internal combustion engine as claimed in claim 1, wherein at least one bearing bulkhead is formed with a thrust support surface for supporting the thrust load applied to said crankshaft, said thrust support surface being located to be contactable with a part of an arm section of said crankshaft.

7. An internal combustion engine as claimed in claim 6, wherein said at least one bearing bulkhead is formed projecting in the direction of the crankshaft axis relative to said bearing cap connected thereto, to form said thrust support surface.

8. An internal combustion engine as claimed in claim 7, wherein said at least one bearing bulkhead is formed with opposite side surfaces facing arm sections of said crankshaft, said opposite side surfaces lying outside the side surfaces of said bearing cap connected thereto, respectively, which bearing cap side surfaces face the arm sections of said crankshaft.

9. An internal combustion engine as claimed in claim 8, wherein said at least one bearing bulkhead is positioned at a central section of the engine in the direction of the crankshaft axis.

10. An internal combustion engine as claimed in claim 3, wherein said bearing caps are integrally connected with each other by two beam sections which extend along the axis of said crankshaft.

11. An internal combustion engine as claimed in claim 10, wherein said two beam sections are located at the opposite bottom corners of each bearing cap.

12. An internal combustion engine as claimed in claim 11, wherein said two beam sections are formed of aluminum alloy.

13. An internal combustion engine as claimed in claim 10 wherein said bearing caps are integrally connected with each other further by side wall sections which extend along the axis of said crankshaft.

14. An internal combustion engine as claimed in claim 13 wherein said two side wall sections are so located as to form part of a crankcase chamber, the upper part of each side wall section being connected to a skirt section of the engine, while the lower part of each side wall is integrally connected to one of said two beam sections.

15. An internal combustion engine as claimed in claim 14, wherein said side wall sections are formed of aluminum alloy.

16. An internal combustion engine comprising:
a cylinder block formed of aluminum alloy and having main bearing bulkheads each of which is formed with a bearing surface;
main bearing caps formed of aluminum alloy and securely connected, respectively, with said bearing bulkheads, said bearing caps being formed with bearing surfaces which are located, respectively, in opposition to the bearing bulkheads, at least one bearing cap being formed with a thrust support surface for supporting thrust load applied thereto;
a crankshaft formed of iron alloy and rotatably supported by said bearing bulkheads and said bearing caps, the main journals of said crankshaft being located between the bearing surfaces of said bearing bulkheads and said bearing caps, the surface of said crankshaft main journals being in direct contact with the bearing surfaces of said bearing bulkheads and said bearing caps, said crankshaft having an arm section contactable with said thrust support surface so that thrust load applied to said crankshaft is supported by said thrust support surface;
means defining a bearing oil groove only on the bearing surface of each bearing bulkhead for supplying engine lubricating oil between the crankshaft main journal and the bearing surfaces of said bearing bulkheads and said bearing caps, said oil groove extending along the periphery of the bearing bulkhead bearing surfaces; and
means for integrally connecting said bearing caps with each other to supporess the movement of said bearing caps.

* * * * *